(12) United States Patent
Roman et al.

(10) Patent No.: US 10,013,979 B1
(45) Date of Patent: Jul. 3, 2018

(54) EXPANDING A SET OF COMMANDS TO CONTROL DEVICES IN AN ENVIRONMENT

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/604,256

(22) Filed: May 24, 2017

Related U.S. Application Data (60) Provisional application No. 62/486,421, filed on Apr. 17, 2017.

(51) Int. Cl.
*G10L 15/06* (2013.01)
*G10L 15/22* (2006.01)

(52) U.S. Cl.
CPC ............. *G10L 15/22* (2013.01); *G10L 15/063* (2013.01); *G10L 2015/0635* (2013.01); *G10L 2015/223* (2013.01)

(58) Field of Classification Search
CPC ......... G10L 15/06; G10L 15/16; G10L 15/34; G10L 2015/233; G10L 2015/223; H04L 12/2803; H04L 12/2816
USPC ....................... 704/232, 243, 270, 270.1, 275
See application file for complete search history.

(56) References Cited

U.S. PATENT DOCUMENTS

| | | | | |
|---|---|---|---|---|
| 6,535,854 B2* | 3/2003 | Buchner | ................. | G10L 15/26 704/275 |
| 9,384,751 B2* | 7/2016 | Venkatesha | ............. | G10L 15/22 |
| 9,530,416 B2* | 12/2016 | Stern | ........................ | G10L 15/30 |
| 9,747,083 B1* | 8/2017 | Roman | ..................... | G06F 8/34 |
| 2003/0187659 A1* | 10/2003 | Cho | ..................... | H04L 12/2803 704/275 |
| 2004/0189720 A1* | 9/2004 | Wilson | ..................... | G06F 3/017 715/863 |
| 2013/0179174 A1* | 7/2013 | Comerford | ............. | G10L 15/22 704/275 |
| 2013/0183944 A1* | 7/2013 | Mozer | ................... | H04L 12/282 704/275 |
| 2015/0287411 A1* | 10/2015 | Kojima | ................... | G10L 15/22 704/246 |
| 2015/0325240 A1* | 11/2015 | Li | ........................... | G10L 15/32 704/231 |
| 2016/0148616 A1* | 5/2016 | Takayanagi | ............. | G10L 15/32 704/235 |

(Continued)

*Primary Examiner* — Martin Lerner
(74) *Attorney, Agent, or Firm* — Perkins Coie LLP (57) ABSTRACT

The present disclosure contemplates a variety of methods and systems for enabling users to automatically expand the set of commands a user can issue. An assistant device can receive a user instruction via microphone and determine a voice activatable command and device description. The assistant device can then identify that no adapter associated with the voice activatable command and device description is available. The user can be prompted to provide a second voice activatable command or a second device description which can then be used to identify an adapter. The assistant device can store the voice activatable command or the device description in association with the identified adapter.

20 Claims, 6 Drawing Sheets

(56) References Cited

U.S. PATENT DOCUMENTS

2016/0378080 A1* 12/2016 Uppala ................ G10L 15/22
　　　　　　　　　　　　　　　　　　　　　　700/275
2017/0205783 A1*　7/2017 Tannenbaum ......... G05B 15/02

* cited by examiner

EXPANDING A SET OF COMMANDS TO CONTROL DEVICES IN AN ENVIRONMENT

CLAIM FOR PRIORITY

This application claims priority to U.S. Provisional Patent Application No. 62/486,421, entitled "Mechanism to Automatically Expand the Set of Commands," by Roman et al., and filed on Apr. 17, 2017, which is incorporated herein by reference in its entirety.

TECHNICAL FIELD

The present disclosure contemplates a variety of improved methods and systems which automatically expand the set of commands a user can issue.

BACKGROUND

The Internet of Things (IoT) allows for the internetworking of devices to exchange data among themselves to enable sophisticated functionality. For example, assistant devices configured for home automation can exchange data with other devices to allow for the control and automation of lighting, air conditioning systems, security, etc. Thus, a smart home environment includes a number of devices that need to connect to the home's wireless network to exchange data. Existing solutions require users to leverage a graphical user interface (GUI) running on a mobile device to communicate with the IoT devices (e.g., lights, thermostat, audio equipment).

SUMMARY

The present disclosure contemplates a variety of improved methods and systems for enabling users to automatically expand the set of commands a user can issue. The improved methods and systems provide an assistant device with the capability to expand the set of commands that it recognizes dynamically. The framework can include a specific type of services called "adapters" to interact with devices in the home. These services are responsible for introducing "skills" to the framework dynamically. For example, if the lights service adapter is installed, it injects into the system the skills that teach the framework how to handle requests such as "lights on", "living room lights off", etc. In another example, a user might say "brew coffee and keep it warm for two hours". In this example, initially, the framework is not aware of any skill that allows for the making of coffee. The framework then goes to the web and searches for an adapter service capable of handling coffee requests. It finds one and installs it in the framework. The adapter service injects the new skills into the framework and scans for a coffee maker that it can control. If it finds one, the framework proceeds and fulfills the user request. This approach can allow the assistant device to learn on demand based on user requests. In at least one embodiment, the assistant device injects skills and provides semantic annotations.

Some of the subject matter described herein includes an assistant device, comprising: a camera; a microphone; a speaker; one or more processors; and memory storing instructions, wherein the processor is configured to execute the instructions such that the processor and memory are configured to: receive via the camera and microphone a user instruction; determine using the user instruction a voice activatable command and a device description; determine that no adapter exists which is associated with the voice activatable command or the device description; request via the speaker a second voice activatable command or a second device description; determine an adapter associated with the second voice activatable command or the second device description, and the voice activatable command or the device description; and store the voice activatable command or the device description in association with the adapter.

Some of the subject matter described herein includes an assistant device, comprising: a microphone; a speaker; one or more processors; and memory storing instructions, wherein the processor is configured to execute the instructions such that the processor and memory are configured to: receive via the microphone a user instruction; determine using the user instruction, a voice activatable command and a device description; determine that no adapter exists which is associated with the voice activatable command or the device description; request via the speaker, a second voice activatable command; determine an adapter associated with the second voice activatable command and the device description; and store the voice activatable command in association with the adapter.

DETAILED DESCRIPTION

The disclosure describes methods, systems, and devices that automatically expand the set of commands a user can issue to an assistant device to perform some functionality using other devices within the home. Furthermore, the present disclosure describes a variety of improved methods and systems for enabling users to automatically expand the set of commands a user can issue to the assistant device. An assistant device configured for home automation can exchange data with other devices to allow for the control and automation of lighting, air conditioning systems, security, etc. Thus, users can use the disclosed features to customize their homes and/or IoT devices to control an automated home environment in a simplified manner. The home environment can include any physical environment within the range of the assistant device, a short range wireless network, and/or a wireless network provided or used by the assistant device.

During the device setup of a connection between an assistant device and one or more devices, the voice activatable commands available for the assistant device to control one or more devices can be identified. The step of setting up the device can also include acquiring and/or identifying the device specific adapter, allowing the assistant device to operate the device. Thus, when a device is set up, the assistant device can identify the relevant voice activatable commands and determine the appropriate adapter associated with the device to perform functionality as indicated in the voice activatable command.

For example, once a smart thermostat is detected, the assistant device can provide audio instructions to the user for setup. Once the user completes the instructions and/or provides responses, the assistant device can identify voice activatable commands for the device such as voice activatable commands to control functions of the thermostat that set temperature, increase heat, or decrease heat. The assistant device can further identify the adapter which allows the assistant device to control the device functions (e.g., set temperature, increase heat, decrease heat, etc.). In an embodiment, upon completion of the setup process, a user can operate the devices via the assistant device. The user operation of the device can include oral speech such as the user instruction "set the temperature to 72 degrees", causing the assistant device to set the thermostat to 72 degrees.

Figure 1:
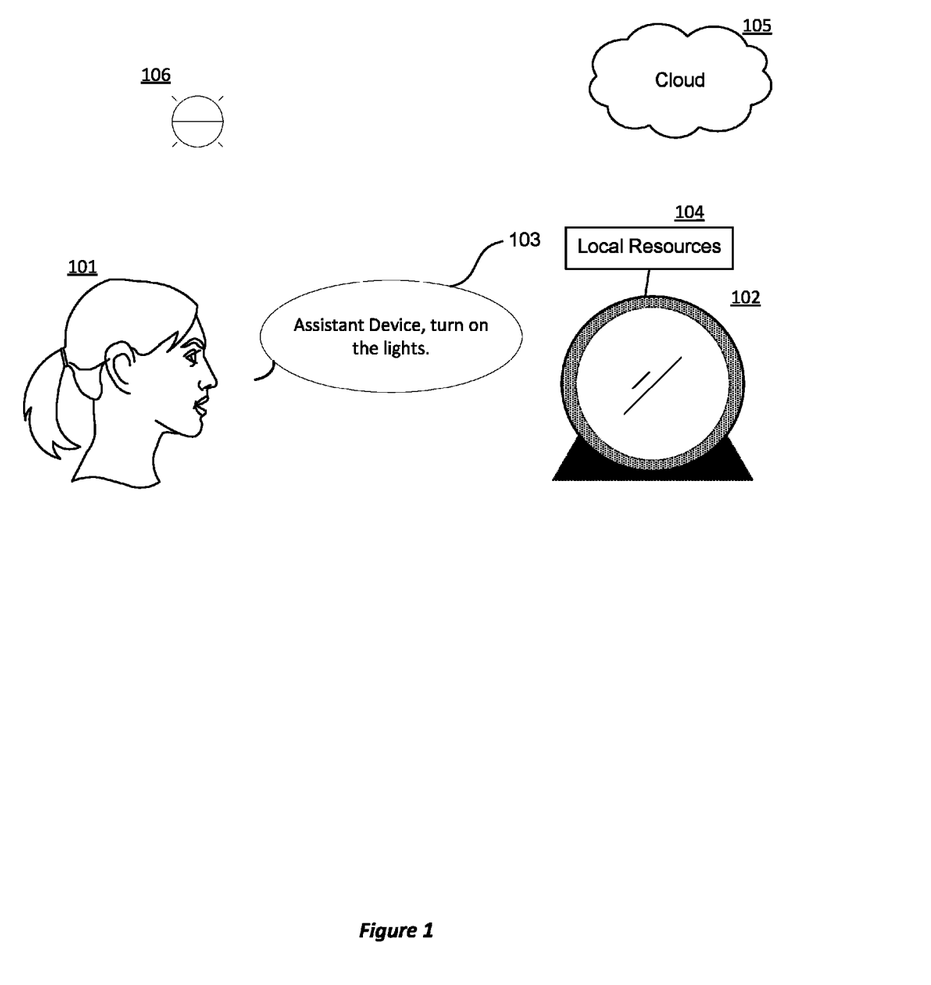
FIG. 1 illustrates an embodiment of a user providing instructions to an assistant device to operate a device.

FIG. 1 illustrates an embodiment of a user 101 providing instructions 103 to an assistant device 102 to operate a device 106. A user 101 can provide the instructions "Assistant Device, turn on the lights" 103 to the assistant device 102. The assistant device 102 can determine the voice activatable command within the user instructions 103. In at least one embodiment, the assistant device can also determine information which can be used to determine which device the user wishes to operate. In the present example, the assistant device can determine that "turn on" is the voice activatable command and that "lights" are indicators of which device which the user wishes to operate.

In at least one embodiment, voice activatable commands are stored in one or more of the local resources 104 and/or one or more of the remote servers. In at least one embodiment, the remote server is a cloud server 105. Local resources can include assistant device local memory storage, storage directly connected to the assistant device, and/or storage of connected devices. The voice activatable commands include commands that a user can speak and cause a device to perform an action (e.g., "turn on", "start", "lock", etc.). The voice activatable commands can also include visual commands a user can gesture (e.g., mouthing 'turn off', moving hand in a specific pattern, looking at the assistant device with a specific expression, etc. by providing some physical action). In at least one embodiment the voice activatable commands do not include visual commands. In at least one embodiment the voice activatable command includes a combination of one or more visual input and of one or more audio input. The action can include a function and/or a skill of one or more devices such as "heat coffee," "record," and "delay wash." For example, voice activatable commands for a locking device can include the commands to lock and unlock. A voice activatable command for starting the wash cycle of a washing machine can include "start wash."

The assistant device can use one or more speech recognition algorithms to identify the user's speech. The user instructions can be recognized by one or more algorithms including Hidden Markov models, Dynamic time warping-based speech recognition, neural networks, and/or end-to-end automatic speech recognition In an embodiment, the assistant device receives user instructions, identifies voice activatable commands within the user instructions, and instructs one or more devices to perform actions based on the received voice activatable commands. In at least one embodiment, a determination is made whether the multiple devices are associated with the voice activatable command. If it is determined that multiple devices are associated with said voice activatable command, the assistant device can use additional information in the user instructions to determine which device and/or devices to instruct to operate. For example, in an environment with multiple devices that "turn on" when a user provides the instruction "turn on the lights", the assistant device can determine that the voice activatable command "turn on" is associated with multiple adapters and devices. The assistant device can then can narrow down the list of devices which the user's instruction may intend to operate to perform the action based on the provided information of "lights" which is determined to indicate the device.

If the assistant device cannot identify the one or more devices which the user intends to operate, the assistant device can ask the user follow-up questions which can help identify the one or more devices. For example, the assistant device may ask the user "I understand you want to turn on a device, which device would you like to turn on?" to which the user can respond "the dishwashing machine." The assistant device can then determine whether there is an adapter associated with a dishwashing machine allows the assistant device to instruct it to "turn on."

Once the assistant device determines that the device the user wants to "turn on" is a dishwashing machine which is connected to the assistant device, then the assistant device can determine whether the "turn on" and "dishwashing machine" are associated with any known adapter. The determination can be made by first searching the local resources, if the search yields no results, then searching cloud storage associated with the assistant device, followed by searching alternate locations if necessary. The determination can also be made by searching local and cloud resources in parallel. In at least one embodiment, the determination can be made by searching local, cloud, and alternate locations in parallel.

The determination of the voice activatable command and device description (as discussed later herein, device description can be an indication as to characteristics of the device, for example, its location, color, age, relation to other devices, etc. that can be used to identify it within the home among other devices) can be identified by one or more machine learning algorithms. The machine learning algorithm can include one or more of the following: decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, supervised learning, unsupervised learning, semi-supervised learning, clustering algorithm, and/or classification algorithm.

Figure 2:
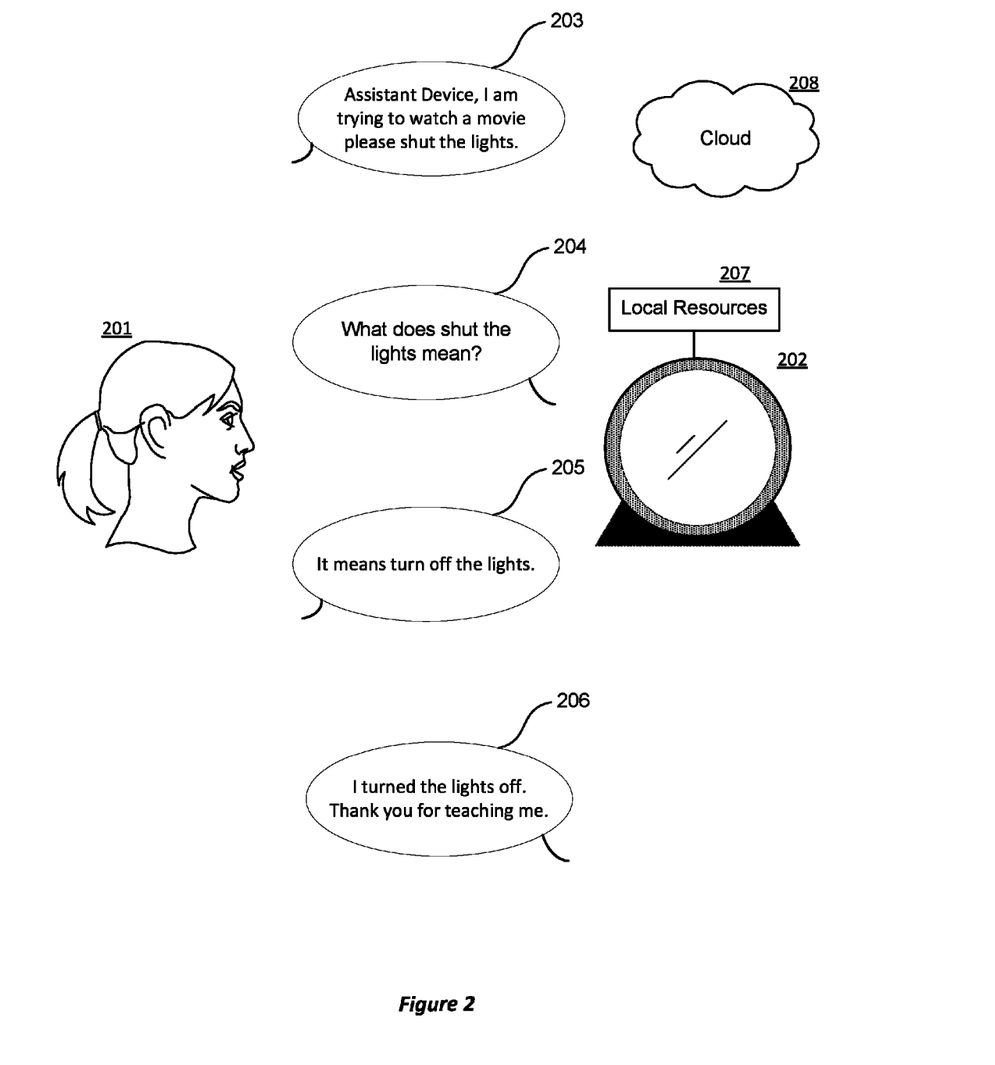
FIG. 2 illustrates an embodiment of a user training the assistant device to expand a set of commands that can be issued.

FIG. 2 illustrates an embodiment where a user trains the assistant device to expand a set of commands a user can issue. User 201 issues an instruction 203 "Assistant Device, I am trying to watch a movie please shut the lights" to the assistant device 202. In an embodiment, the issued instruction causes the assistant device to determine the one or more voice activatable commands in the user instruction. For example, the assistant device identifies that "shut the lights" is the voice activatable command in the instruction 203. The assistant device can then determine that "shut" is intended as a voice activatable command, and "lights" is intended to indicate the device. The assistant device can then check whether "shut" is a known voice activatable command and/or associated with a known voice activatable command;

it can further check whether "shut" is associated with a known device associated with the device description "lights."

In the FIG. 2 embodiment, the assistant device 202 determines that the voice activatable command "shut" is not a known voice activatable command. The determination can be made by first searching the local resources, if the search yields no results, then searching cloud storage associated with the assistant device, followed by searching alternate locations if necessary. The determination can also be made by searching local and cloud resources in parallel. In at least one embodiment, the determination can be made by searching local, cloud, and alternate locations in parallel.

In the present example, once the assistant device determines that the "shut" voice activatable command is not known, the assistant device prompts the user 201 with a question 204, "what does 'shut the lights' mean?" The user 201 in response 205 answers "it means turn off the lights". The assistant device can identify the voice activatable command within the user statement 205, as "turn off" and further identify "lights" as a being associated with a device.

The assistant device can determine whether the commands "turn off" and "lights" are associated with any known adapter. The determination can be made by first searching the local resources, if the search yields no results, then searching cloud storage associated with the assistant device, followed by searching alternate locations if necessary. The determination can also be made by searching local and cloud resources in parallel. In at least one embodiment, the determination can be made by searching local, cloud and alternate locations in parallel.

In an embodiment, once an adapter associated with "turn off" and "lights" is identified, the assistant device can send a request to the identified "lights" device to "turn off." The assistant device can further store the "shut" command as a synonym for "turn off" and associate it with the adapter. After the synonym is stored, in at least one embodiment, the assistant device can thank 206 the user 201 for teaching it.

Figure 3:
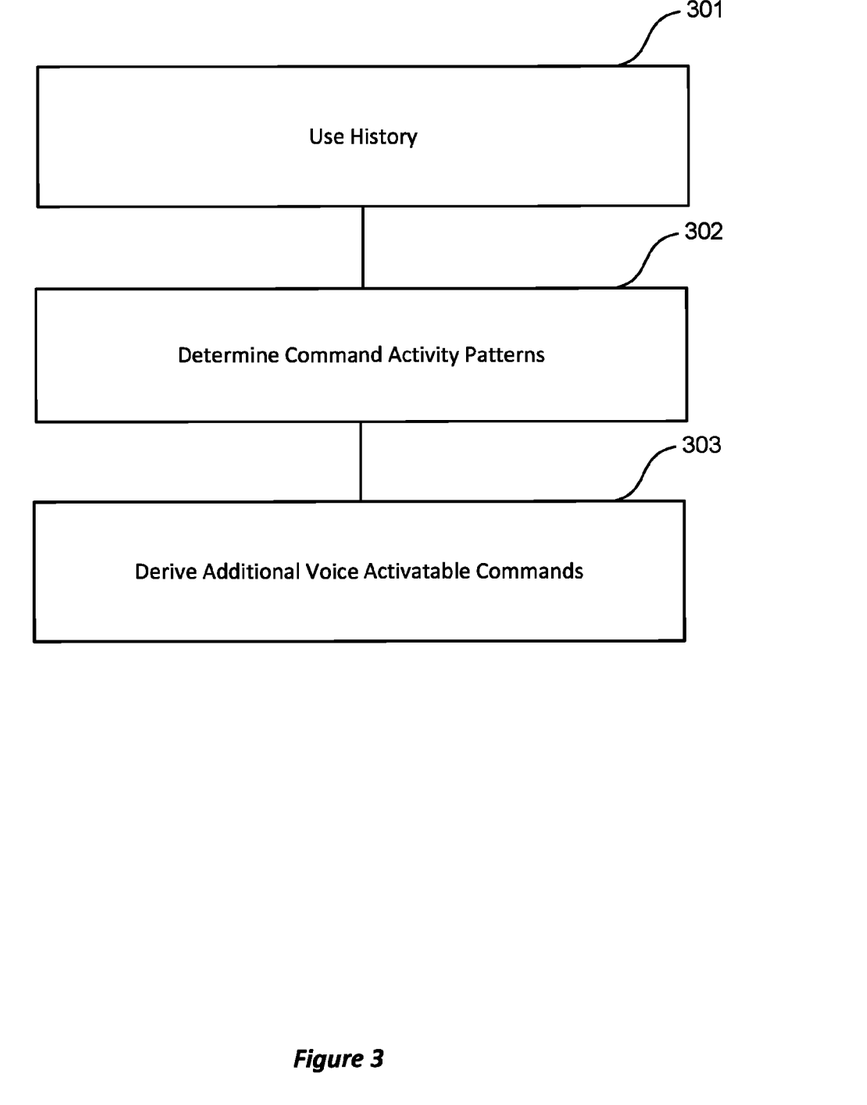
FIG. 3 illustrates a block diagram of an embodiment of the voice activatable commands being expanded through the analysis of use history.

FIG. 3 illustrates a block diagram of an embodiment of the voice activatable commands being expanded through the analysis of use history 301. In at least one embodiment, the assistant device can store use history of the assistant device and/or connected devices. In other embodiments, only relevant interactions with the assistant device can be stored. For example, relevant interactions can include interactions which were identified as voice activatable commands and/or potential voice activatable commands, such as the term "shut", in the user interaction of 203 " . . . shut the lights please". In at least one embodiment, the use history includes the actions performed by a user and/or operation of one or more devices after issuing a voice activatable command and/or potential voice activatable command. For example, if the user 201 issued the command of 203 " . . . shut the lights please", the assistant device did not cause the lights to be turned off, and the user 201 physically turned the lights off. In an embodiment, this sequence of events would be stored in the use history 301. In an embodiment, the use history includes user's physical gestures recorded within temporal proximity (e.g., 1 minute before, 180 seconds after, etc.) to the interactions which were identified as voice activatable commands and/or potential voice activatable commands such the term "shut" in the user interaction of 203 " . . . shut the lights please".

The user history 301 can be analyzed at block 302 to determine command activity patterns. For example, if a user snaps her fingers each time she provides instructions to turn off the lights, it can be determined that finger snapping is a synonymous voice activatable command to "turn off" for "lights" device. In another example, a user provides the instructions "clean dishes", and when the dishwasher does not initiate, the user goes over and physically turns it on. In this example, it can be determined that "clean dishes" is a synonymous voice activatable command to "turn on" for the dishwasher device. This determination can be made by pattern recognition. It can also be made using one or more machine learning algorithms. One or more of visual recognition algorithms and speech recognition algorithms can be used to aid in the determination.

At block 303, the synonymous voice activatable command can be stored in association with the adapter. In at least one embodiment, the assistant devices prompts the user to determine whether the derived synonymous voice activatable command should be stored. For example, prior to storing the synonymous voice activatable command "clean dishes" in association with "turn on" for the dishwasher device, the assistant device can be configured to ask for permission from the user. The assistant device can ask the user "I noticed when you say 'clean the dishes' you turn on the dishwasher, would you like me to store this as a command?" In at least one embodiment, the assistant device automatically stores, without asking for user's permission, the synonymous voice activatable command in association adapter of the device and voice activatable command.

Figure 4:
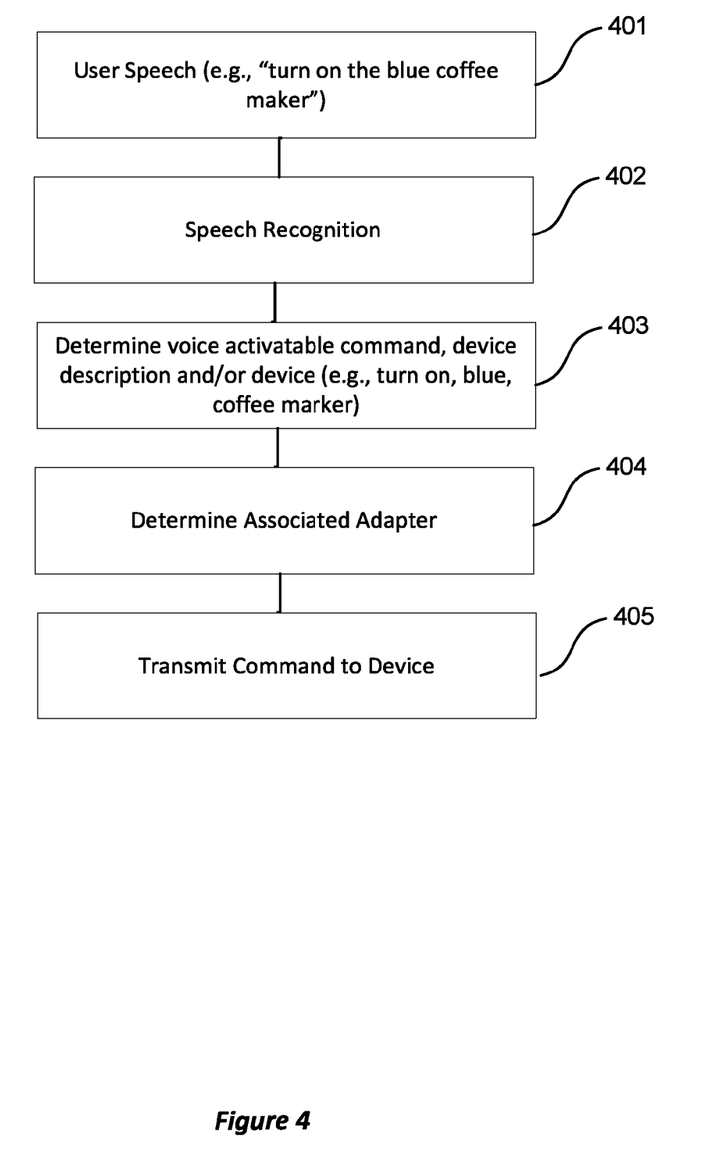
FIG. 4 is a block diagram of workflow of a user instruction causing a device to perform an action.

FIG. 4 is a block diagram of workflow of an user instruction causing a device to perform an action. At step 401, the user provides instructions (e.g., "turn on blue coffee maker", etc.). The instructions are then analyzed; analysis includes speech recognition.

The recognized text of step 402 is analyzed further to determine the voice activatable command, device description and/or device at step 403. The voice activatable commands are a set of one or more words which are determined to be potentially voice activatable commands. These words can include "turn on", "lock", "turn off", "make", "start", "dim", "close", etc. For example, in the user instruction "turn on the blue coffee maker", the "turn on" can be identified as a voice activatable command. In the step 203, "shut" can be identified as the voice activatable command. Additionally, in at least one embodiment, the user instructions are analyzed to determine a device description. For example, it can be determined that in the instructions of "turn on the blue coffee maker", the "blue" and "coffee maker" are device descriptions.

Because the voice activatable commands might be similar for multiple devices, the device and device description can be stored to allow the assistant device to determine which device to operate. For example, to turn on and off the lights can be associated with one or more devices capable of turning on and off light.

At step 404, the identified voice activatable command, the device description, and/or the device are used to determine the associated adapter. The assistant device can store device descriptions about the devices such as the device location, type, and/or color (e.g., kitchen, toaster, silver, etc.).

In at least one embodiment, the device description of only the connected devices is stored. For example, in this embodiment, the device description of a device the user chose not to set up would not be stored. The configuration of this embodiment can conserve assistant device resources. The device description can be stored on the local resources of the assistant device and/or on the remote server. The device description can be added by the user as a part of the installation process. This information can be added via a user response and/or a user instruction. For example, the assistant device can prompt the user: "Thank you for performing the steps to set up the printer. Can you provide additional information about where the printer is located?" The user can respond with the location (e.g., "The printer is located in the living room."). The assistant device can process the user response with a speech recognition algorithm and determine that the device description for the printer device is "living room." The device description can also be set by user instruction. For example, the user can provide an instruction "assistant device, please turn on the lamp in the living room." In response, the assistant device can send an instruction for the lamp to turn on and store the device description about the lamp (e.g. "in living room"). In at least one embodiment, the user can respond and/or instruct the assistant device with one or more of the following: speech, physical gesture, and/or textual input. In at least one embodiment, the device description can include device information, wherein device information includes information gathered during setup. In an embodiment, the device description can exclude device information. In at least one embodiment, the device information is the information gathered pre-setup during the initial stages of connecting the one or more devices to the assistant device. The device information can include model number, IP address, media access control address (MAC), etc.

The determination 404 of the associated adapter can include first searching the local resources, and if the search yields no results, then searching cloud storage associated with the assistant device, followed by searching alternate locations if necessary. The determination can also be made by searching local and cloud resources in parallel. In at least one embodiment, the determination can be made by searching local, cloud, and alternate locations in parallel.

Furthermore, the determination 404 of the associated adapter can include searching first for locally stored adapters for the identified voice activatable command and only searching using device and/or device description when more than one adapter is determined to meet the voice activatable command criteria. For example, all locally stored adapters associated with the words "turn on" can be identified only when more than one adapter matching the criteria is identified, identifying the device using the device description "blue coffee maker" to identify the device to operate. The locally stored adapters can include adapters stored on the device local resources 104. In at least one embodiment, the locally stored adapters include adapters stored on a cloud resource that is allocated specifically for the assistant device storage. In at least one embodiment, the locally stored adapters exclude adapters stored on the cloud and/or other remote resources.

In an embodiment, the determination 404 of the associated adapter can include searching first for locally stored adapters for the identified voice activatable command, device description, and/or device to identify the associated adapter. The locally stored adapters can include adapters stored on the device's local resources 104. In at least one embodiment, the locally stored adapters include adapters stored on a cloud resource allocated specifically for the assistant device. In at least one embodiment, the locally stored adapters exclude adapters stored on the cloud and/or other remote resources.

In an embodiment, where more than one locally stored adapter is identified, the assistant device can ask questions to the user to identify the correct adapter. For example, in an embodiment where multiple adapters are associated with "turn off" and "lights", the assistant device can use the stored device description to ask a user to identify the unique adapter. In the example, the assistant device can ask the user "I have identified two light devices in the home, do you want me to turn off the living room lights or the bedroom lights?"

In an embodiment, where no locally stored adapter is identified, the assistant device can search alternate locations such as an public adapter library and/or a device manufacturer website to identify the correct adapter. In at least one embodiment where the assistant device cannot locate the associated adapter, the assistant device can ask the user questions to determine more information; see example of FIG. 2.

Once the adapter is identified, the assistant device can transmit the command 405 via the adapter to the appropriate device and cause the device to perform the function which the user requested via user instructions 401. For example, the user provides instructions "turn on dishwasher", "turn on" is identified as voice activatable command, dishwasher is identified as the device description, the assistant device identifies the correct adapter and transmits the command to the dishwasher, causing the dishwasher to turn on.

In at least one embodiment, the setup of a device includes assigning a device specific adapter which maps the device functionality to one or more voice activatable commands. In at least one embodiment, the adapter is a driver. In at least one embodiment, determining the appropriate adapter can include downloading the relevant adapter to a local resource. Determining the appropriate adapter can also include referencing the location of the adapter stored on a shared resource.

Figure 5:
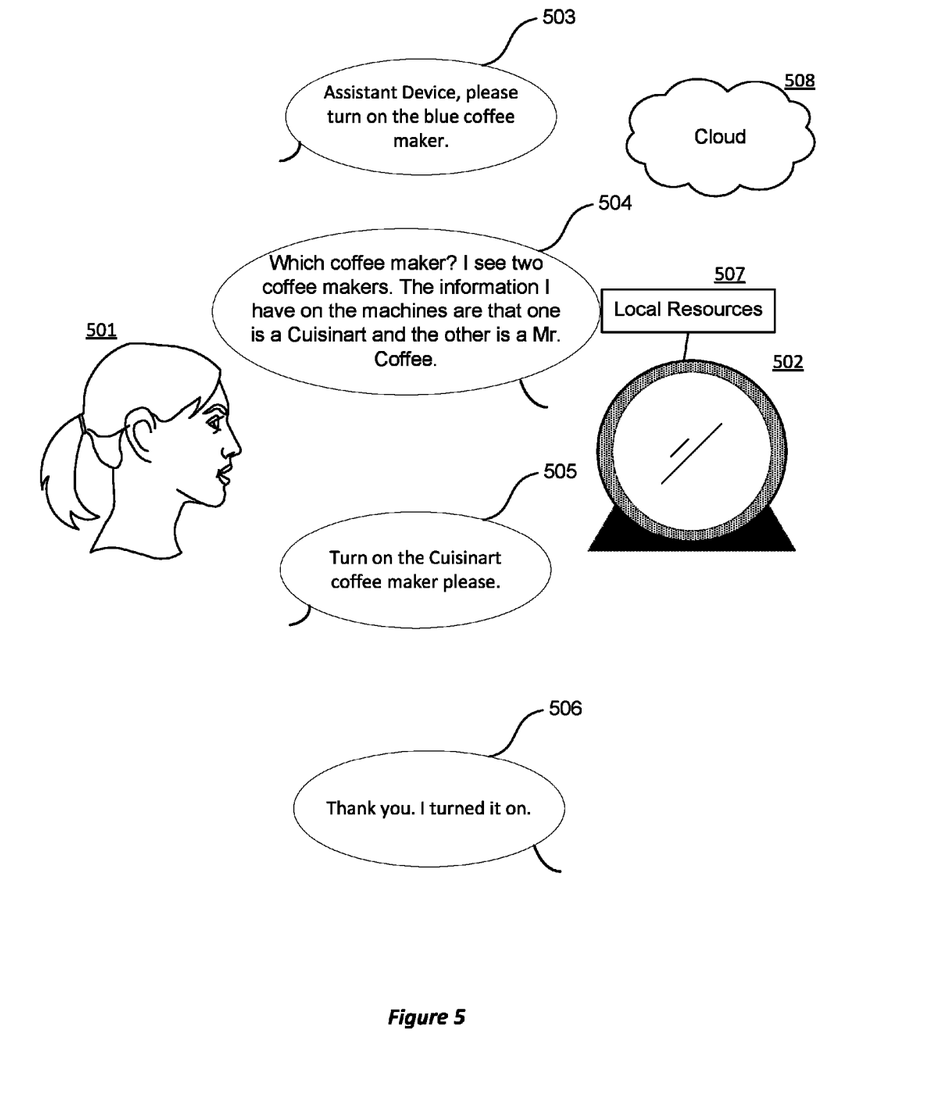
FIG. 5 illustrates an embodiment of the user training the assistant device to expand a set of device descriptions.

FIG. 5 illustrates an embodiment of the assistant device expanding a set of device descriptions to expand a set of commands a user can issue. User 501 issues a user instruction 503 "Assistant Device, please turn on the blue coffee maker" to the assistant device 502. In an embodiment, the issued instruction causes the assistant device to identify one or more voice activatable commands and/or one or more device description. It can be determined that "turn on" is the voice activatable command, and "blue" and "coffee maker" are the device descriptions.

In the example, several adapters exist with the device description "coffee makers" with "turn on" voice activatable commands and no adapters matching the device descriptions "coffee makers" and "blue" with "turn on" voice activatable commands. At step 504, the assistant device asks the user to determine which coffee maker to turn on: "Which coffee maker? I see two coffee makers. The information I have on the machines are that one is a Cuisinart and the other is a Mr. Coffee." The user provides the answer at 505 "Turn on the Cuisinart coffee maker please." The assistant device determines that "Cuisinart" is the device description of one of the two previously identified adapters that match "coffee maker" and "turn on" then narrows down the adapters to one unique adapter. The assistant device can respond with "Thank you. I turned it on" at 506.

The determination can be made by first searching the local resources 507; if the search yields no results then searching cloud 508 storage associated with the assistant device, followed by searching alternate locations if necessary. The determination can also be made by searching local and cloud resources in parallel. In at least one embodiment, the determination can be made by searching local, cloud, and alternate locations in parallel.

In an embodiment, the assistant device can store the device description of "blue" in association the adapter associated with "Cuisinart" and "turn on". This step allows for the assistant device to learn additional device descriptions so that next time the user instructs the assistant device to "turn on the blue coffee maker", the assistant device will identify the correct adapter and cause the Cuisinart coffee maker to perform the task. In some embodiments the assistant device can ask the user for confirmation before saving the device description. For example the assistant device may ask "I noticed you referred to the Cuisinart coffee maker as blue. Is this correct?"

Although many of the examples of the disclosure describes voice activatable commands as verbal, in at least one embodiment, the voice activatable commands include physical movements by the user (e.g., user pointing, using mouthing words, etc.). In at least one embodiment, the voice activatable commands include a combination of one or more physical movement and one or more verbal statement (e.g., user instructing the assistant device to "turn that on" while pointing to a device).

Figure 6:
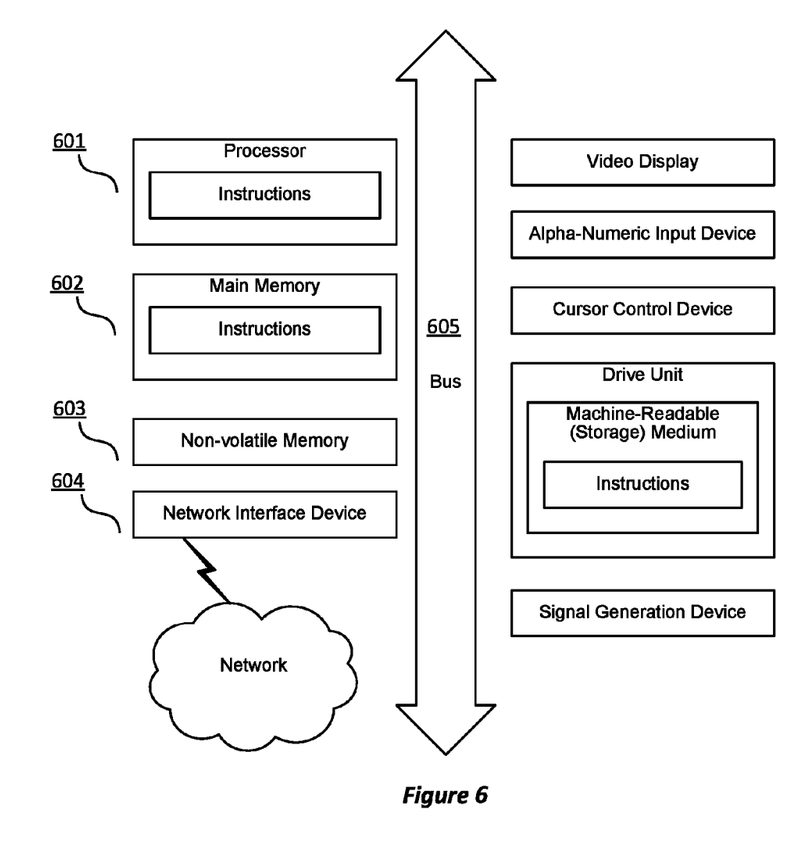
FIG. 6 illustrates an embodiment of the assistant device, including a processor, memory, non-volatile memory, and an interface device.

In FIG. 6, the assistant device includes a processor 601, memory 602, non-volatile memory 603, and an interface device 604. Various common components (e.g., cache memory) are omitted for illustrative simplicity. The assistant device is intended to illustrate a hardware device on which any of the components described in the example of FIGS. 1-5 (and any other components described in this specification) can be implemented. The components of the assistant device can be coupled together via a bus 605 or through some other known or convenient device.

In at least one embodiment, the assistant device can be operated using an ambient operating system such as a meta-operating system targeted at IoT and ubiquitous computing scenarios. Ambient OSes orchestrate ambient resources and provide a set of abstractions and APIs which simplify the development of dynamic ambient-oriented services and applications that span the reach of a single device. Ambient OSes can be written in JavaScript, run on NodeJS, and are driven by the following principles: simplicity, mechanism and policies, domain customizability, and user-centric focus.

The processor 601 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 602 is coupled to the processor by, for example, a bus. The memory can include, by way of example but not limitation, random access memory (RAM), such as dynamic RAM (DRAM) and static RAM (SRAM). The memory can be local, remote, or distributed.

The bus 605 also couples the processor 601 to the non-volatile memory 603 and drive unit. The non-volatile memory 603 is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote, or distributed. The non-volatile memory is optional, because systems can be created with all applicable data available in memory. A typical computer system will usually include at least a processor, memory, and a device (e.g., a bus) coupling the memory to the processor.

The software is typically stored in the non-volatile memory 603 and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 605 also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device. For simplicity, it is assumed that controllers of any devices not depicted in the example of FIG. 6 reside in the interface.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is, therefore, intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for automatically expanding voice activatable commands for an assistant device to cause one or more devices to perform a functionality, within an environment, comprising:
   receiving, via a camera and a microphone, a first image frame depicting a user movement and a first audio input of a user speech in the environment;
   using the first image frame and the first audio input to identifying a voice activatable command representing that the user has an intention to implement the functionality using a device of the one or more devices within the environment to be performed using the assistant device, the voice activatable command including an identified movement in the first image frame, and an identified portion of the first audio input;
   using the first image frame or the first audio input to identify a device description representing descriptive information about the device which a user requested to control in the environment;
   determining that an adapter which is associated with the voice activatable command or the device description is not available, the adapter representing a driver associated with the device and providing the assistant device with a capability to instruct the device to perform the functionality;
   requesting via a speaker a second voice activatable command or a second device description responsive to the determination that no adapter is available;
   receiving a second image frame depicting a second user movement and a second audio input of a second user speech in the environment responsive to the request for the second voice activatable command or the second device description;
   using the second image frame and the second audio input to identifying the second voice activatable command representing the user's request to control the device in the environment, or the second device description representing descriptive information about the device in the environment;
   determining the adapter associated with the second voice activatable command or the second device description;
   storing the voice activatable command or the device description in association with the adapter; and
   performing the functionality using the adapter, the assistant device, and the one or more devices within the environment that is capable of performing the functionality to fulfill the intention indicated in the second image frame and the second audio input.

2. A method, comprising:
   receiving, via processor, a first image frame depicting a user movement and a first audio input of a user speech in an environment;
   using the first image frame and the first audio input to identifying a voice activatable command representing a user's request to control a device in the environment, the voice activatable command including an identified movement in the first image frame, and an identified portion of the first audio input;
   using the first image frame or the first audio input identify a device description representing descriptive information about the device in the environment;
   determining that no adapter representing a driver associated with the device is associated with the voice activatable command and device description;
   providing an audio request to the user for information capable of identifying the adapter representing the driver associated with the device;
   receiving a second image frame depicting a second user movement and a second audio input of a second user speech in the environment;
   using the second image frame and the second audio input to identifying a second voice activatable command representing the user's request to control the device in the environment, or a second device description representing descriptive information about the device in the environment;
   using the second voice activatable command or the second device description to determine the adapter associated with the device which the user requested to control in the environment;
   storing the voice activatable command or the device description in association with the adapter.

3. The method of claim 2, wherein determination of the voice activatable command and the device description is performed by a machine learning algorithm.

4. The method of claim 2, further comprising:
   receiving a visual input corresponding to the first image frame depicting a physical action of user's request to control the device in the environment, wherein device description is further based on the first image frame.

5. The method of claim 4, wherein the determination that the adapter is unavailable includes first performing a search using a local resource then performing a search using remote resources.

6. The method of claim 5, further comprising transmitting a request to the device associated with the adapter, the request instructing the device to perform a functionality.

7. The method of claim 5, wherein the determination that the adapter is unavailable includes searching a public adapter library or device manufacturer website.

8. The method of claim 4, wherein the determination that the adapter is unavailable includes a parallel search of a local resource, cloud resources, and one or more of a public adapter library and a device manufacturer website.

9. The method of claim 8, wherein the determination of the adapter associated with the second voice activatable command and the device description includes the parallel search of the local resource, the cloud resources, and one or more of the public adapter library and the device manufacturer website.

10. The method of claim 4, wherein determining the voice activatable command and the device description includes recognizing speech using a speech recognition algorithm.

11. An electronic device, comprising:
   a microphone;
   a speaker;
   a camera;
   a processor; and memory storing instructions, wherein the processor is configured to execute the instructions such that the processor and memory are configured to:
receive, via the microphone and the camera, a first image frame depicting a user movement and a first audio input of a user speech in an environment;
identify a voice activatable command using the first image frame and the first audio input, the voice activatable command representing a user's request to control a device in the environment, the voice activatable command including an identified movement in the first image frame, and an identified portion of the first audio input;
identify using the first image frame or the first audio input a device description representing descriptive information about the device in the environment;
determine that no adapter representing a driver associated with the device is associated with the voice activatable command and device description;
provide an audio request to the user for information capable of identifying the adapter representing the driver associated with the device;
receive a second image frame depicting a second user movement and a second audio input of a second user speech in the environment;
identify using the second image frame and the second audio input a second voice activatable command representing the user's request to control the device in the environment, or a second device description representing descriptive information about the device in the environment;
determine using the second voice activatable command or the second device description the adapter associated with the device which the user requested to control in the environment;
store the voice activatable command or the device description in association with the adapter.

12. The electronic device of claim 11, wherein determination of the voice activatable command and the device description is performed by a machine learning algorithm.

13. The electronic device of claim 11, wherein the camera configured to generate visual input corresponding to the first image frame depicting a physical action of user's request to control the device in the environment, wherein device description is further based on the first image frame.

14. The electronic device of claim 13, wherein the determination that the adapter is unavailable includes first performing a search using local resource then performing a search using remote resources.

15. The electronic device of claim 14, further comprising transmitting a request to the device associated with the adapter, the request instructing the device to perform a functionality.

16. The electronic device of claim 14, wherein the determination that the adapter is unavailable includes searching a public adapter library or device manufacturer website.

17. The electronic device of claim 13, wherein the determination that the adapter is unavailable includes a parallel search of a local resource, cloud resources, and one or more of a public adapter library and a device manufacturer website.

18. The electronic device of claim 17, wherein the determination of the adapter associated with the second voice activatable command and the device description includes the parallel search of the local resource, the cloud resources, and one or more of the public adapter library and the device manufacturer website.

19. The electronic device of claim 13, wherein determining the voice activatable command and the device description includes recognizing speech using a speech recognition algorithm.

20. An electronic device, comprising:
a processor;
a database having a plurality of records having adapters, device descriptions and voice activatable commands;
memory storing instructions, wherein the processor is configured to execute the instructions such that the processor and memory are configured to:
receive a first image frame depicting a user movement and a first audio input of a user speech in an environment;
identify a voice activatable command of the voice activatable commands using the first image frame and the first audio input, the voice activatable command representing a user's request to control a device in the environment, the voice activatable command including an identified movement in the first image frame, and an identified portion of the first audio input;
identify using the first image frame or the first audio input a device description of the device descriptions representing descriptive information about the device in the environment;
determine that there are no matching record identifying an adapter in the database having the first voice activatable command and the device description;
provide an audio request to the user for information capable of identifying the adapter representing a driver associated with the device;
receive a second image frame depicting a second user movement and a second audio input of a second user speech in the environment;
identify using the second image frame and the second audio input a second voice activatable command representing the user's request to control the device in the environment, or a second device description representing descriptive information about the device in the environment;
identify using the database, the second voice activatable command or the second device description the adapter associated with the device which the user requested to control in the environment;
store the voice activatable command or the device description in association with the matching record.

* * * * *